United States Patent Office 3,555,448
Patented Jan. 12, 1971

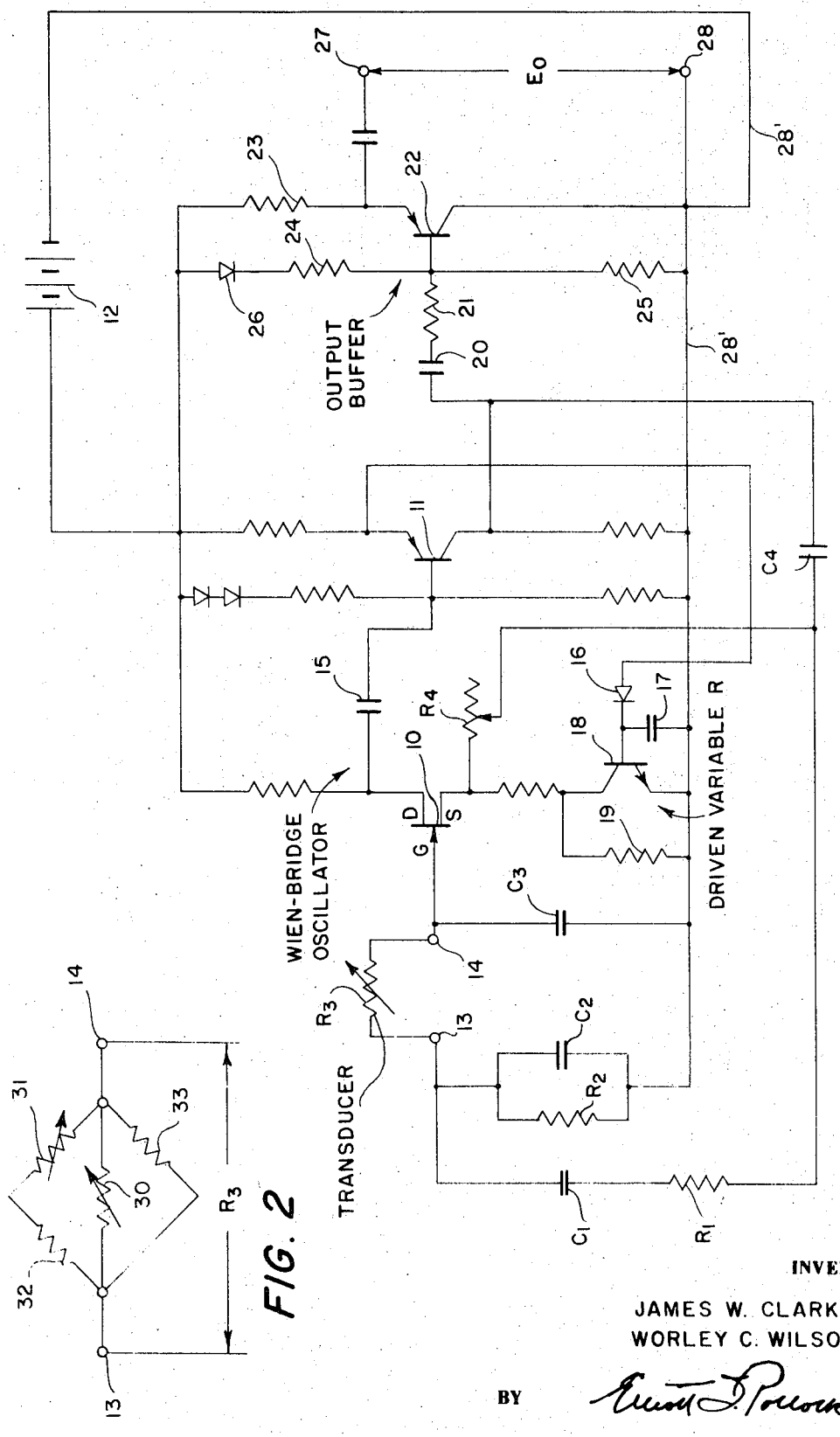

3,555,448
TRANSDUCER CONTROLLED VARIABLE FREQUENCY WIEN-BRIDGE OSCILLATOR
James W. Clarke, Jr., Plantation, and Worley C. Wilson, Jr., Fort Lauderdale, Fla., assignors to Data Research Corporation, Fort Lauderdale, Fla., a corporation of Florida
Filed June 3, 1969, Ser. No. 830,159
Int. Cl. H03b 5/26
U.S. Cl. 331—65                                    10 Claims

ABSTRACT OF THE DISCLOSURE

The frequency selective bridge of a standard Wien-bridge oscillator is provided with an additional phase shifting network comprising a capacitor and a linearized transducer. The transducer exhibits impedance changes responsive to physical variations of a function being measured; and the overall circuit directly converts such transducer impedance variations into a linear digital function in a computer compatible format without the use of a voltage driven analog-to-digital converter module.

BACKGROUND OF THE INVENTION

The present invention relates to an improved circuit for converting the non-linear impedance analog of a sensing transducer into a digital computer compatible format without the use of a complex voltage driven analog-to-digital converter module.

Various operational techniques, computation systems, process control arrangements, etc., require the measurement or monitoring of one or more parameters, and the provision of electrical information relating to the measured or monitored parameter for various control and computation functions. To this effect, a wide variety of arrangements have been suggested in the past for converting physical parameter information, such as temperature, position, flow, rotary motion, acceleration, velocity, etc., into related electrical signal information.

As a general proposition, sensor transducers known at the present time for the measurement or monitoring of physical parameters provide output electrical signals which are related to non-linear logarithmic impedance variations dependent upon variations in the pertinent physical parameter. Known sensor transducers are, therefore, basically analog devices. In view of the emphasis which has been given by industry toward the development and use of digital computers in process control loops, efforts have been made to convert the analog output of known transducers into digital form; and known systems along this line ordinarily convert the analog transducer impedance characteristics into D.C. voltages which are then, in turn, transformed in an analog-to-digital converter module into computer compatible digital signals. To assist in this type of voltage conversion, it has also been suggested that linearization circuits be provided so that the signal applied to the analog-to-digital converter is a direct voltage, and one which is a linear function of the physical parameter being measured.

Known systems of the types described above, operative to produce a direct voltage signal which is in turn coupled to an analog-to-digital converter, have a number of disadvantages which have been long recognized but, for the most part, merely tolerated. For example, the transmission of accurate D.C. voltages over long lines is very difficult. Therefore, in systems employing such direct voltage signals, the measurement or monitoring instrument normally has to be kept very close to the transducer in order to minimize possible errors. In a process control system, this consideration requires multiple analog-to-digital converters throughout the system to establish accurate control of the system; and these considerations in turn severely limit the versatility of any given process control system, and greatly increase its complexity, cost, and maintenance requirements.

In contrast to arrangements employing direct voltage signals, digital signals can be easily transmitted over long distances; and if the frequency of the digital signal is used to provide the information transfer function, no loss in accuracy of information will be caused by the long line. In addition to the ease with which digital frequency rates may be transmitted, pulse trains of digital signals can be easily changed to a computer compatible format by a simple counter arrangement. Indeed, when measurement information is transmitted as a frequency, one remotely located counter can handle a plurality of transducers. Systems capable of directly producing digital signals, corresponding in informational content to the physical variation of a function being measured, are thus highly desirable.

Some efforts have been made in the past to provide preferred systems of the types described, wherein digital signals are directly produced, e.g., by using a transducer to control the frequency of an oscillator. One such system is shown, for example, in Horwitz U.S. Pat. 3,392,348. The Horwitz system employs a Wien-bridge oscillator, and connects a sensor transducer in the series RC arm of the oscillator frequency selective bridge, so that the output frequency of the oscillator varies with impedance changes in the transducer while, at the same time, keeping the voltage drop across the transducer small. By this arrangement, Horwitz suggests that his circuit allows a transducer with a low breakdown voltage to control the output of a high powered oscillator (an operational result which, as will become apparent, is also characteristic of the present invention).

The Horwitz system, by incorporating the transducer into one arm of the main frequency determining bridge of the Wien-bridge oscillator, exhibits a number of disadvantages which are overcome by the different circuit arrangement of the present invention.

SUMMARY OF THE INVENTION

The improved circuit to be described hereinafter provides a means whereby a non-linear transducer may be used to give a linear frequency change which is proportional to the transducer's non-linear impedance change. The improved circuit of the present invention subjects the transducer to less current flow than in the Horwitz circuit identified previously, thereby reducing sensor self-heating effects; and further assures that the base operating frequency of the system is not dependent on the basic impedance of the transducer, as in the Horwitz circuit, since the transducer of the present invention is positioned exterior to and independent of the prime series and parallel arms of the Wien-bridge. The circuit to be described thus constitutes a highly improved transducer impedance digitizer designed to convert an impedance change occurring in a transducer, due to a physical variation in a function being measured, e.g., temperature, pressure, position, etc., into a frequency change; and adapted, moreover, to achieve this desirable result in an arrangement which avoids many of the disadvantages of related circuits suggested heretofore.

The present invention comprises, in a broad sense, an oscillator that has its output frequency controlled by the resistance of a transducer. The oscillator employed is of the Wien-bridge type incorporating a frequency determining bridge comprising a series RC arm and a parallel RC arm; and this basic oscillator structure, which is in itself known, is associated with an output buffer to prevent any external load changes from reflecting back into the oscillator to cause related frequency changes, and is further associated with a driven variable resistor circuit operative to maintain loop amplitude stability in the oscillator as the oscillator frequency is changed.

The main control in oscillator frequency is achieved through the use of an additional phase shift network consisting of a capacitor and a linearized transducer, with said aditional phase shift network being added to the standard Wien-bridge phase shifting network. The transducer itself, by being part of such a separate phase shift network, makes the base frequency of operation of the circuit independent of the basic impedance of the transducer, and also assures that the transducer is subjected to smaller current flow and reduced self-heating effects. In order to reduce the effects of equivalent series resistance in the capacitors employed, parameter values are so selected that the base frequency of oscillator output, with the transducer shorted, is no more than 10% higher than the oscillator output frequency when the transducer exhibits its maximum impedance value; and, in order to increase oscillator stability and to allow for a greater frequency deviation within the specified 10% total frequency deviation limits, the parameters are so chosen that the base frequency of operation is preferably greater than 100 kc.

BRIEF DESCRIPTION OF THE DRAWINGS

FIG. 1 is a schematic diagram of an improved transducer impedance digitizer constructed in accordance with the present invention; and FIG. 2 is a schematic diagram of one form of linearized transducer which may be employed in the present invention.

DESCRIPTION OF THE PREFERRED EMBODIMENTS

The present invention comprises an essentially standard Wien-bridge oscillator. The overall circuit includes a field effect transistor 10 having gate (G), drain (D), and source (S) terminals as indicated; a further transistor 11 connected to transistor 10 in the manner shown; and an appropriate energization source for the elements 10 and 11, e.g., a battery 12. While the particular circuit shown in FIG. 1 employs solid state elements of the transistor type, it will be appreciated that similar such circuits may be employed in accordance with the present invention using other forms of voltage or current control devics and/or vacuum tubes.

In the FIG. 1 arrangement, field effect transistor 10 acts as the oscillator stage, and transistor 11 acts as an amplifier and inverter. The overall circuit includes a frequency-selective bridge (ignoring for the moment $R_3$ and $C_3$) which comprises a series RC or first arm $R_1$, $C_1$; a parallel RC or second arm $R_2$, $C_2$; a third arm comprising potentiometer $R_4$, and a fourth arm comprising a driven variable resistance 16–19 (to be described). The junction of the first and second arms of the frequency selective bridge (again ignoring $R_3$) is coupled to the gate terminal (G) of transistor 10, and the junction of the third and fourth arms of the bridge is connected to the source terminal (S) of transistor 10. The output of the amplifier and inverter stage is coupled from the collector of transistor 11 via capacitor $C_4$ to the junction of the first and third arms of the frequency selective Wien-bridge. The junction of the second and fourth arms of the frequency selective bridge is coupled to line 28', which is in turn connected to output terminal 28 and to the negative side of battery 12, a point of reference potential.

The circuit also includes an auxiliary phase shifting network comprising a transducer $R_3$ connected across transducer terminals 13, 14 between the interconnected series and parallel RC bridge arms and the gate terminal of transistor 10, and a capacitor $C_3$ connected in series with transducer $R_3$. The auxiliary network $R_3$, $C_3$ is (in the particular arrangement illustrated) connected in parallel with the parallel RC arm $R_2$, $C_2$ of the Wien-bridge frequency determining circuit.

The drain terminal (D) of transistor 10 is coupled via capacitor 15 to the base of transistor 11. The emitter of transistor 11 is coupled to a variable resistance circuit (the aforementioned fourth arm of the Wien-bridge) in the source circuit of transistor 10. This variable resistor circuit consists of a diode 16, capacitor 17, transistor 18, and resistor 19, and is driven by the emitter of transistor 11 in order to maintain loop amplitude stability in the Wien-bridge oscillator as the oscillator frequency is changed by variations in the impedance magnitude of transducer $R_3$.

The sine-wave output of the Wien-bridge oscillator is coupled via a capacitor 20 and resistance 21 to an emitter follower output buffer circuit comprising transistor 22, resistors 23, 24, and 25, and a diode 26. The ultimate sine-wave output of the circuit ($E_0$) is taken from the emitter follower output buffer across terminals 27 and 28. Output buffer 22–26 prevents any external load changes from reflecting back into the Wien-bridge oscillator to cause an undesirable frequency change therein. The frequency of the sine-wave output appearing across terminals 27, 28 is directly related to the resistance value of the linearized transducer $R_3$.

Considering now the operation of the FIG. 1 circuit, let us first assume that resistor $R_3$ and capacitor $C_3$ are removed, and that terminals 13, 14 are shorted together. With this assumed change in the illustrated circuit, the resultant circuit comprises an essentially conventional Wien-bridge oscillator having an emitter follower output buffer. The frequency of operation of the circuit would (again ignoring $R_3$ and $C_3$) be determined by the phase shifting networks $R_1$, $C_1$ and $R_2$, $C_2$ in the Wien-bridge. More particularly, if the Wien-bridge phase shifting networks $R_1$, $C_1$ and $R_2$, $C_2$ produce no phase shift, the circuit will oscillate owing to the 180° phase shift of amplifiers 10 and 11. In conventional fashion, the frequency determining bridge of the circuit will shift the phase of all frequencies except one, and that frequency will be the frequency at which the oscillator will actually oscillate.

For no phase shift to occur, the angles of the impedances of series network $R_1$, $C_1$ must be equal to that of the parallel network $R_2$, $C_2$. This condition occurs at a frequency $F_0'$, which is determined by the bridge parameters in accordance with the equation:

$$F_0' = \frac{1}{2\pi\sqrt{R_1 R_2 C_1 C_2}}$$

from the above equation, it would initially appear that the output frequency $F_0'$ should vary linearly with a linear change in the resistance of $R_1$ and $R_2$. In practice, however, this does not occur because of the internal series resistance in the capacitors $C_1$ and $C_2$. This internal series resistance, or equivalent series resistance (ESR) is an ohmic quantity which varies as a function of frequency in accordance with the equation $$ESR = \frac{DF}{2\pi FC \times 100}$$

where ESR is the equivalent series resistance in ohms,

DF is the capacitor dissipation factor, F is the operating frequency in cycles per second, and C is the capacitance. Moreover, even if the series resistance of capacitors $C_1$ and $C_2$ failed to significantly affect the operating frequency, the output frequency $F_0'$ would vary linearly with a linear change in resistance of $R_1$ and $R_2$ only if both of resistors $R_1$ and $R_2$ were linearized transducers.

It will be appreciated from the foregoing discussion, therefore, that a linear frequency output, varying as a function of a parameter being measured, cannot be achieved with a conventional Wien-bridge oscillator simply by adding a parameter responsive transducer to one or both arms of the standard frequency determining bridge, or by replacing one or both of resistors $R_1$, $R_2$ with such a transducer. At the very least, in an effort to obtain a linear frequency output, both of resistors $R_1$ and $R_2$ would have to be linearized; and even with this additional complexity, linearity is not achieved because of the internal series resistances of capacitors $C_1$ and $C_2$.

In accordance with the present invention, these disadvantages of a conventional Wien-bridge oscillator are overcome, and an improved transducer impedance digitizer is achieved, by the addition of a supplemental phase shift network comprising transducer $R_3$ and capacitor $C_3$ connected to the frequency sensitive Wien-bridge. By adding this additional network $R_3$, $C_3$ a single linearized tranducer may be used to control the oscillator frequency, and the overall effect of wide variations in frequency due to transducer resistance change is reduced as compared to a circuit wherein $R_1$ and/or $R_2$ itself comprises a transducer. If transducer $R_3$ is non-linear, the output of the overall circuit is still a linear frequency change which is proportional to the transducer's non-linear impedance change.

Considering the modified Wien-bridge circuit shown in FIG. 1, let us first assume that $R_3$ is shorted (terminals 13 and 14 are connected together), in which event capacitor $C_3$ would be connected directly across the parallel bridge arm $R_2$, $C_2$. With $R_3$ shorted, the basic operating frequency of the resultant system is defined by the equation $$F_0 = \frac{1}{2\pi\sqrt{R_1 R_2 C_1 (C_2 + C_3)}}$$

As $R_3$ is increased, $F_0$ will be reduced. At the correct frequency of oscillation, the $R_3$, $C_3$ network will have a phase angle of 90°.

In order to reduce the effect of ESR in the capacitors, the circuit parameters employed should be so chosen that the basic operating frequency $F_0$, with $R_3$ shorted, is no more than 10% higher than the output frequency generated when $R_3$ is at its maximum resistance value. In addition, the circuit parameters employed should be so chosen that the minimum output frequency is, whenever practical, greater than 100 kc. A high $F_0$ in this order of magnitude produces greater oscillator stability, and allows a greater frequency deviation per unit change in $R_3$ without exceeding the 10% total frequency deviation limits specified.

It should, moreover, be noted that the placement of transducer $R_3$ in a separate or additional phase shifting network, rather than as part of one of the arms of the standard frequency determining bridge, has an added advantage insofar as the transducer operation itself is concerned. By placing transducer $R_3$ in a separate network, the transducer is required to handle only a very small current due to the voltage divider nature of the bridge and due to the high input impedance of the input amplifier 10. This significantly reduces any self-heating effect in the transducer.

While FIG. 1 has illustrated the transducer $R_3$ as a single resistor, the transducer arrangement $R_3$ preferably comprises a composite resistor made up of the transducer itself and an associated resistance network operative to linearize the resistance change across the terminals of the composite resistor with respect to a non-linear change in the resistance of the transducer. FIG. 2 shows one such composite resistor adapted for use as a temperature sensor. The composite resistor $R_3$ includes temperature sensitive resistance elements 30 and 31 and fixed resistance elements 32 and 33 interconnected to one another as shown and adapted to be connected into the circuit of FIG. 1 between terminals 13 and 14. It will be appreciated that the other linearized transducer arrangements can be employed.

Once the transducer resistance has been linearized by an arrangement of the type shown in FIG. 2, or an appropriate alternative arrangement, linearity of the overall circuit can be improved even further by an additional adjustment. More particularly, with the composite resistor $R_3$ in place, $R_3$ is adjusted to its maximum resistance value, and the value of $R_1$ is then varied until the peak signal level at terminal 13 is the same as that at terminal 14.

Having thus described our invention, we claim:

1. A transducer impedance digitizer comprising a Wien-bridge oscillator having a frequency selective bridge, said bridge including four arms one of which is a series RC arm and another of which is a parallel RC arm, and means responsive to variations in a parameter being monitored for varying the output frequency of said oscillator, said last-named means comprising an additional phase shift network connected across at least one of the arms of said bridge, said additional phase shift network including a transducer having a resistance which varies with variations in said parameter and a capacitor connected to said transducer.

2. The digitizer of claim 1 wherein said transducer is connected in series with said capacitor.

3. The digitizer of claim 1 wherein said additional phase shift network is connected in parallel with the parallel RC arm of said bridge.

4. The digitizer of claim 1 wherein said transducer comprises a composite resistor including a variable resistance sensor element and further resistance elements connected to said sensor for linearizing the resistance change across said composite resistor with respect to a non-linear change in the resistance of said sensor element.

5. The digitizer of claim 1 wherein said Wien-bridge oscillator includes an oscillator stage, one end of said series and parallel RC arms being connected to one another, and the junction of said RC arms being connected via said transducer to a control element of said oscillator stage.

6. The digitizer of claim 5 wherein said Wien-bridge oscillator includes an amplifier and inverter stage, one of the arms of said frequency selective bridge comprising a variable resistance arm, and means coupling the output of said amplifier and inverter stage to said variable resistance arm of said bridge for varying the resistance of said arm with changes in the output frequency of said oscillator.

7. The digitizer of claim 6 wherein said oscillator stage, said amplifier and inverter stage, and said variable resistance bridge arm each comprises a transistor.

8. The digitizer of claim 6 including an output buffer circuit connected to the output of said amplifier and inverter stage.

9. The digitizer of claim 1 wherein the parameter values of said bridge and said additional phase shift network are so selected that the output frequency of said oscillator, when said transducer resistance is at its minimum value, is no more than 10% different from the output frequency of said oscillator when said transducer resistance is at its maximum value.

10. The digitizer of claim 9, wherein the parameter values of said bridge and said additional phase shift network are so selected that the minimum output frequency of said oscillator is greater than 100 kc.

References Cited

UNITED STATES PATENTS

| | | | |
|---|---|---|---|
| 3,144,619 | 8/1964 | Cochran | 331—110 X |
| 3,392,348 | 7/1968 | Horwitz | 331—141 X |

OTHER REFERENCES

Lövborg, "A linear temperature-to-frequency converter," Journal of Scientific Instruments, vol. 42, 1965, pp. 611–614.

ROY LAKE, Primary Examiner

S. H. GRIMM, Assistant Examiner

U.S. Cl. X.R.

331—110, 141, 177